C. ROSA.
COFFEE URN.
APPLICATION FILED SEPT. 20, 1911.
1,014,610.
Patented Jan. 9, 1912.
2 SHEETS—SHEET 1.
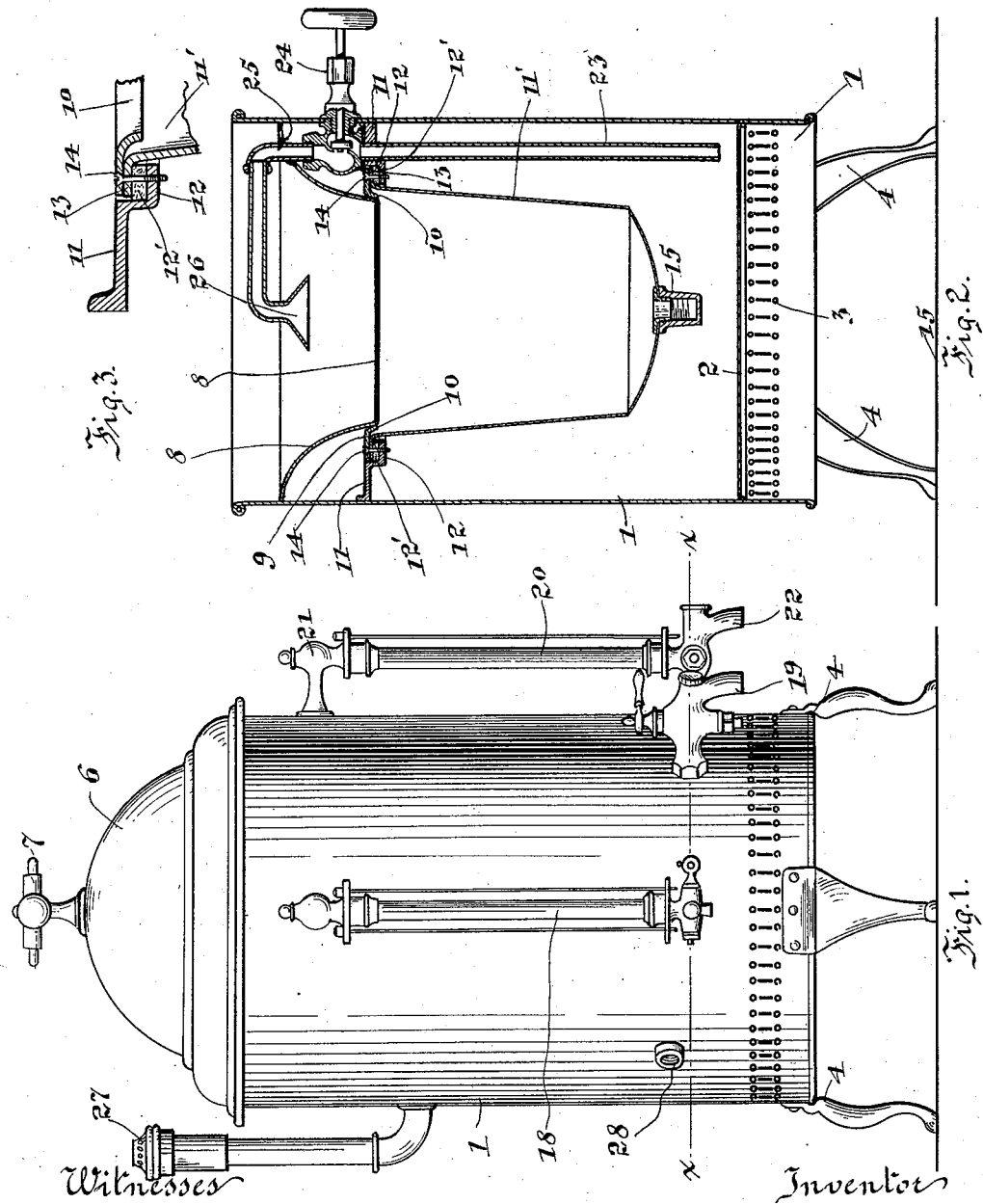

C. ROSA.
COFFEE URN.
APPLICATION FILED SEPT. 20, 1911.

1,014,610.

Patented Jan. 9, 1912.
2 SHEETS—SHEET 2.

Witnesses
W. T. Smith
B. G. Richards

Inventor
Charles Rosa
by Joshua R. H. Potts
his Attorney

UNITED STATES PATENT OFFICE.

CHARLES ROSA, OF CHICAGO, ILLINOIS.

COFFEE-URN.

1,014,610.  Specification of Letters Patent.  Patented Jan. 9, 1912.

Application filed September 20, 1911. Serial No. 650,423.

*To all whom it may concern:*

Be it known that I, CHARLES ROSA, a citizen of the United States, residing at the city of Chicago, county of Cook, and State of Illinois, have invented certain new and useful Improvements in Coffee-Urns, of which the following is a specification.

My invention relates to improvements in coffee urns such as used in restaurants and hotels, the object being to provide a coffee urn of such a construction that the coffee receptacle may be readily removed for the purpose of removing scale and other impurities in the water boiler of the urn.

The invention consists in the combinations and arrangements of parts hereinafter described and claimed.

Figure 4:
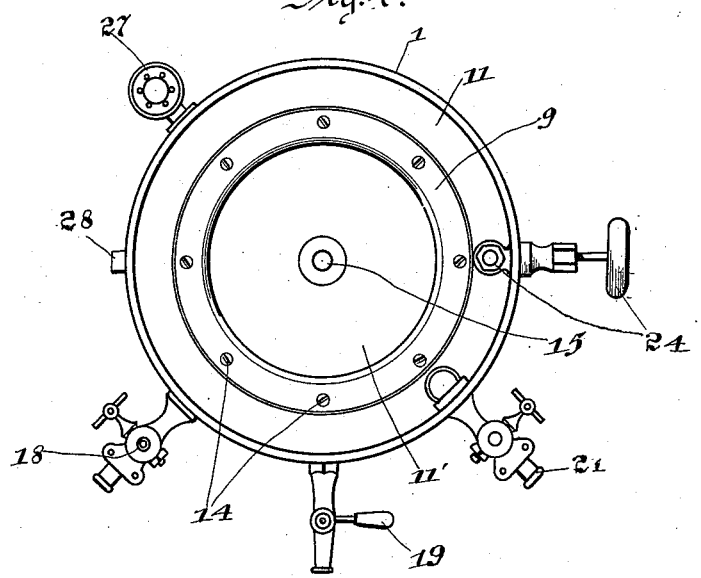
Figure 5:
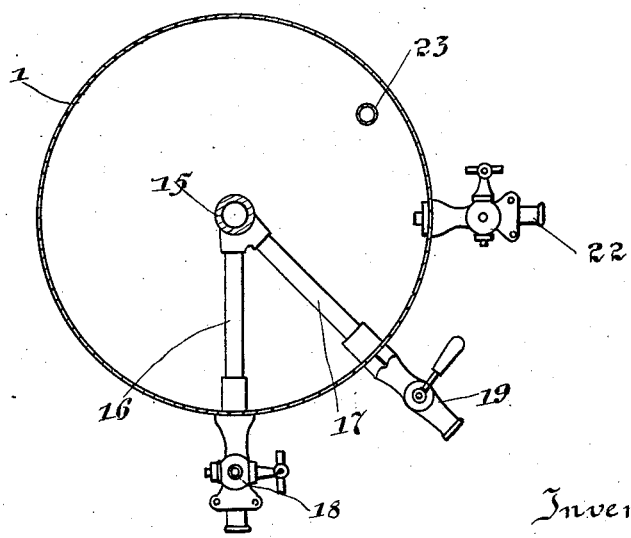

The invention will be best understood by reference to the accompanying drawings forming a part of this specification and in which, Figure 1 is a side elevation of a coffee urn embodying my invention, Fig. 2 is a vertical section of the urn, Fig. 3 is a detail vertical section showing a portion of the coffee receptacle and means for securing the same in position, Fig. 4 is a top plan view of the coffee urn, and Fig. 5 is a horizontal section partly in plan taken on line *x—x* of Fig. 1.

The preferred construction as illustrated in the accompanying drawings comprises an exterior shell or boiler 1 having a circular bottom 2 beneath which the burner, not shown, employed in conjunction with the urn, is positioned. A plurality of draft apertures 3 is provided in that portion of the shell 1 which extends below the bottom 2. Suitable legs 4 are provided to make clearance between the bottom 2 and the support of the burner, not shown. The cover or lid 6 of the urn may be ornamental in form if so desired and provided with a handle 7 by means of which the same is readily manipulated. After removal of the cover 6 the urn appears as shown in Fig. 2, there being a funnel 8 the periphery of which conforms to the inner side of the shell 1 and the lower end of which extends into the supporting ring 9 having a depending flange 10. The function of the funnel 8 is to properly direct coffee when poured into the coffee boiler or receptacle 11'. The ring 9 is arranged concentrically with the shell 1 as illustrated in Fig. 4 and is supported by an annular horizontally disposed partition 11 having a flange at its periphery which is soldered or otherwise secured to the shell 1. The annular ring 11 is dropped at its inner edge and formed into a horizontally extending flange 12, the drop of the latter being sufficient to bring the upper surface of the ring 9 flush with the upper surface of the partition 11 after the coffee receptacle 11' has been positioned as shown in Fig. 2. In order to provide a steam tight connection between the receptacle 11' and the flange 12 a suitable packing 12' such as rubber is interposed between said flange and the peripheral flange 13 of said receptacle. The ring 9, flange 13 and gasket or packing 12' are brought into close relation by means of a plurality of screws 14 which are passed through these parts as clearly illustrated in Figs. 2 and 4. Thus when positioning the receptacle 11' the screws 14 must be screwed into the flange 12 after the ring 9 is placed over the flange 13. When it is desired to remove the receptacle 11' for the removal of scale or other impurities in the boiler into which it projects it is only necessary to remove the ring 9 and the screws 14, whereupon said receptacle is easily lifted out of the boiler. The receptacle 11' is preferably formed of aluminum in sheet metal form since this metal is non-corrosive and has a minimum of weight. Other metals may be employed but aluminum is peculiarly adapted for this purpose. Since the coffee is put directly into the receptacle 11', no intermediate vessel being employed, the conduction of heat from the boiler to the coffee is direct and unobstructed.

Provided at the lower end of the coffee receptacle 11' is a coupling 15 from which radiates pipes 16 and 17, the former being connected to a coffee gage glass 18 and the latter to a service faucet 19 by means of which coffee is drawn from the receptacle 11' in any desired quantity. The gage glass 20 for the boiler 1 is shown in Fig. 1 and comprises boiler connections 21 and 22 as shown in Figs. 1, 4 and 5. In order to fill or partially fill the coffee receptacle 11' with hot water a vertically disposed pipe 23 is located on the interior of the boiler 1 and adjacent the wall thereof as shown in Fig. 2. The upper end of this pipe extends through the partition 11 into a valve 24. From this valve extends an elbow 25 which connects with a delivery hood 26, the latter being located directly over the receptacle 11' as shown in Fig. 2. From this construction it is apparent that when it is desired to add hot water to the coffee contained within the receptacle 11' that it is only necessary to open the valve 24, whereupon hot water will flow from the boiler 1 as above stated. A safety blow-off device 27 is connected with the boiler 1 as shown in Fig. 1, the necessity of such device being well understood by those skilled in the art. In order to fill the boiler 1 with cold water the same is arranged in pipe connection with a source of water supply, there being a pipe coupling 28 projecting from said boiler as shown in Figs. 1 and 4.

The mode of operation is as follows: After the boiler 1 has been nearly filled with cold water and the burner beneath the same set in operation the urn is ready for use. After placing the desired amount of coffee in the receptacle 11' the valve 24 is opened which causes the introduction of the required amount of hot water into the receptacle 11' for the making of coffee therein. The service cock 19 is used for drawing off the coffee for serving the same. The placing and removal of the coffee receptacle has been thoroughly explained in the foregoing description, further explanation being unnecessary.

A coffee urn as set forth peculiarly meets the demands in a device of this character, and the same is symmetrical of design, simple of construction and highly efficient in its operation.

While I have illustrated and described the preferred construction for carrying my invention into effect, this is capable of variation or modification without departing from the spirit of the invention. I therefore do not wish to be limited to the exact details of construction set forth but desire to avail myself of such variations and modifications as come within the scope of the appended claims.

Having described my invention what I claim as new and desire to secure by Letters Patent is:

1. A coffee urn comprising a cylindrical vertical boiler shell, a bottom provided for said shell, an annular partition arranged adjacent the top of said shell and rigidly secured thereto, the interior edge of said partition being dropped forming a horizontal flange, a receptacle having a peripheral flange at the edge or top end thereof, said peripheral flange being co-extensive with said first named flange and adapted to be supported thereby, a gasket or packing interposed between said flanges, a plurality of securing screws passed through said peripheral flange and said packing into said first named flange, a ring placed over said peripheral flange through which said screws are also passed, a depending flange at the inner portion of said last named ring, and a funnel supported by said last named flange, substantially as described.

2. A coffee urn comprising a vertical tubular boiler shell, a bottom provided for said shell, an annular partition secured to said shell and arranged adjacent the top thereof, the inner portion of said partition being formed into a horizontal flange which is dropped from the main portion of said partition forming a rabbet, means for introducing water into said boiler, a receptacle the large end of which is provided with a peripheral flange of an extent substantially co-extensive with the extent of said first named flange, said flanges being provided with a plurality of screw holes, an annular gasket or packing adapted to be interposed between said flanges and provided with screw holes registering with the screw holes provided in the latter, a ring having an interior depending flange substantially co-extensive with said peripheral flange and resting thereon, there being a plurality of screw holes provided in said ring registering with said first named screw holes, a plurality of screws passed through said registering screw holes and adapted to secure said ring, packing and flanges into close relation, a funnel fitting into the top of said boiler and supported by said depending flange formed in said ring, and means for drawing away liquid contained in said receptacle, substantially as described.

3. A coffee urn comprising a tubular vertical boiler shell, a bottom for said shell, a plurality of supporting legs secured to the lower edge of said shell, a pipe coupling provided on said shell through which water is introduced into the boiler, an annular partition secured to the interior of said shell adjacent the top thereof, a drop flange provided at the inner edge of said partition, a packing fitting said flange and supported thereby, a receptacle having a peripheral flange at the upper edge thereof which is substantially co-extensive with said first named flange and positioned thereabove, said receptacle tapering downwardly, a coupling provided at the center of the bottom of said receptacle, a pipe radiating from said coupling by means of which liquid contained in said receptacle is drawn off therefrom, a ring having an internal depending flange supported by the peripheral flange of said receptacle, means for securing said ring, peripheral flange, packing and said first named flange into close relation, a funnel fitting the interior of said boiler shell and supported by said depending flange, and means for introducing water into said receptacle from said boiler comprising a vertical pipe arranged in said boiler and extending through said annular partition, a valve into which said pipe terminates, an elbow secured into said valve, and a radially disposed pipe leading from said elbow to a point directly over the center of said receptacle, substantially as described.

4. A coffee urn comprising a vertical cylindrical boiler shell formed of metal, a metallic bottom for said shell, a metallic annular partition arranged concentrically in said shell adjacent the top thereof, a sheet metal receptacle having a peripheral flange at the upper end thereof projecting over the inner edge of said partition, a packing interposed between said peripheral flange and said partition, a ring superimposed on said peripheral flange, a plurality of screws adapted to hold said ring, peripheral flange, packing and partition in close relation, a bell-mouthed funnel the periphery of which is adapted to fit into said shell and the small end of which is supported by said ring, means for introducing water into said receptacle from said boiler, means for withdrawing liquid from said receptacle, and means for determining the level of the liquid in said boiler and receptacle, substantially as described.

5. In a coffee urn, a cylindrical metallic boiler shell the axis of which is vertically disposed, a bottom provided for said shell adjacent the lower edge thereof, an annular partition provided in said shell and arranged adjacent the top edge thereof, a depressed horizontally extending flange provided in said partition and having a plurality of tapped holes therein, a coffee receptacle the upper periphery of which is formed into a horizontally extending flange having screw holes arranged in registration with said tapped holes, a packing interposed between said horizontal and peripheral flanges and having holes for registration with the holes of said flanges, a ring super-imposed on said peripheral flange and provided with a flange at the inner edge thereof, said ring being provided with screw holes arranged in registration with the screw holes of said flanges, a plurality of screws adapted to be passed through said screw holes of said ring, peripheral flange, and packing and screwed into the tapped holes of said horizontal flange, a bell-mouthed funnel supported by the flange on the inner shell of said ring and fitted into said boiler shell adjacent the upper end thereof, a service pipe and gage glass pipe leading from the lower end of said receptacle which is formed of aluminum, and means for transferring water from said boiler into said receptacle, substantially as described.

In witness whereof I have signed my name to this specification in the presence of two subscribing witnesses.

CHARLES ROSA.

Witnesses:
 HELEN F. LILLIS,
 JOSHUA R. H. POTTS.

Copies of this patent may be obtained for five cents each, by addressing the "Commissioner of Patents, Washington, D. C."